(12) United States Patent
Sasaki et al.

(10) Patent No.: US 11,011,965 B2
(45) Date of Patent: May 18, 2021

(54) PERMANENT MAGNET SYNCHRONOUS MOTOR

(71) Applicants: Nissan Motor Co., Ltd., Yokohama (JP); Wisconsin Alumni Research Foundation

(72) Inventors: Kensuke Sasaki, Kanagawa (JP); Takashi Fukushige, Kanagawa (JP); Takashi Katou, Kanagawa (JP); Apoorva Athavale, Madison, WI (US); Robert D. Lorenz, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 351 days.

(21) Appl. No.: 15/747,879

(22) PCT Filed: Jul. 31, 2015

(86) PCT No.: PCT/US2015/043155
§ 371 (c)(1),
(2) Date: Jan. 26, 2018

(87) PCT Pub. No.: WO2017/023250
PCT Pub. Date: Feb. 9, 2017

(65) Prior Publication Data
US 2018/0219463 A1 Aug. 2, 2018

(51) Int. Cl.
*H02K 21/02* (2006.01)
*H02K 1/27* (2006.01)
(Continued)

(52) U.S. Cl.
CPC .......... *H02K 21/024* (2013.01); *H02K 1/276* (2013.01); *H02K 1/278* (2013.01); *H02P 6/08* (2013.01);
(Continued)

(58) Field of Classification Search
CPC ...... H02K 21/024; H02K 1/278; H02K 1/276; H02K 1/02; H02K 1/2713; H02K 2213/09
(Continued)

(56) References Cited

U.S. PATENT DOCUMENTS

| 4,423,453 A | 12/1983 | Kawahara et al. |
| 2008/0303368 A1 | 12/2008 | Rahman et al. |

(Continued)

FOREIGN PATENT DOCUMENTS

| JP | 2009027847 A | * | 2/2009 |
| JP | 2010-4671 A | | 1/2010 |

(Continued)

OTHER PUBLICATIONS

Machine Translation JP2009027847 (Year: 2009).*
Machine Translation JP2010004671A (Year: 2010).*

*Primary Examiner* — Jose A Gonzalez Quinones
(74) *Attorney, Agent, or Firm* — Global IP Counselors, LLP

(57) ABSTRACT

A permanent magnet synchronous motor includes a stator, a rotor rotatable relative to the stator, and a magnetic structure with a low coercive force magnet and a high coercive force magnet that are arranged magnetically in series with respect to each other to define a pole-pair of the permanent magnet synchronous motor. A magnetization level of the low coercive force magnet is changeable by a stator current pulse such that a stator magnetomotive force at a rated current is equal to or larger than a product of a magnetic field strength for fully magnetizing the low coercive force magnet and a thickness of the low coercive force magnet.

8 Claims, 6 Drawing Sheets

(51) Int. Cl.
*H02P 6/08* (2016.01)
*H02P 25/28* (2006.01)
*H02P 9/12* (2006.01)

(52) U.S. Cl.
CPC .............. *H02P 9/123* (2013.01); *H02P 25/28* (2013.01); *H02K 2213/03* (2013.01); *H02K 2213/09* (2013.01)

(58) Field of Classification Search
USPC .... 310/151.01–156.84, 152, 154.21, 156.01, 310/156.56
See application file for complete search history.

(56) References Cited

U.S. PATENT DOCUMENTS

| | | | | |
|---|---|---|---|---|
| 2009/0261774 | A1* | 10/2009 | Yuuki | H02K 1/2766 318/720 |
| 2010/0327787 | A1* | 12/2010 | Sakai | H02K 1/276 318/400.09 |
| 2011/0304235 | A1 | 12/2011 | Hashiba et al. | |
| 2012/0091848 | A1 | 4/2012 | Sasaki et al. | |
| 2013/0127280 | A1 | 5/2013 | Sugimoto et al. | |
| 2014/0375160 | A1* | 12/2014 | Zhang | H02K 1/27 310/154.26 |
| 2016/0149524 | A1* | 5/2016 | Fukushige | H02P 29/00 318/400.41 |
| 2018/0219504 | A1* | 8/2018 | Sasaki | H02P 21/13 |

FOREIGN PATENT DOCUMENTS

| | | |
|---|---|---|
| JP | 2010004671 A * | 1/2010 |
| JP | 2010-124608 A | 6/2010 |
| WO | 2012/014260 A1 | 2/2012 |

* cited by examiner

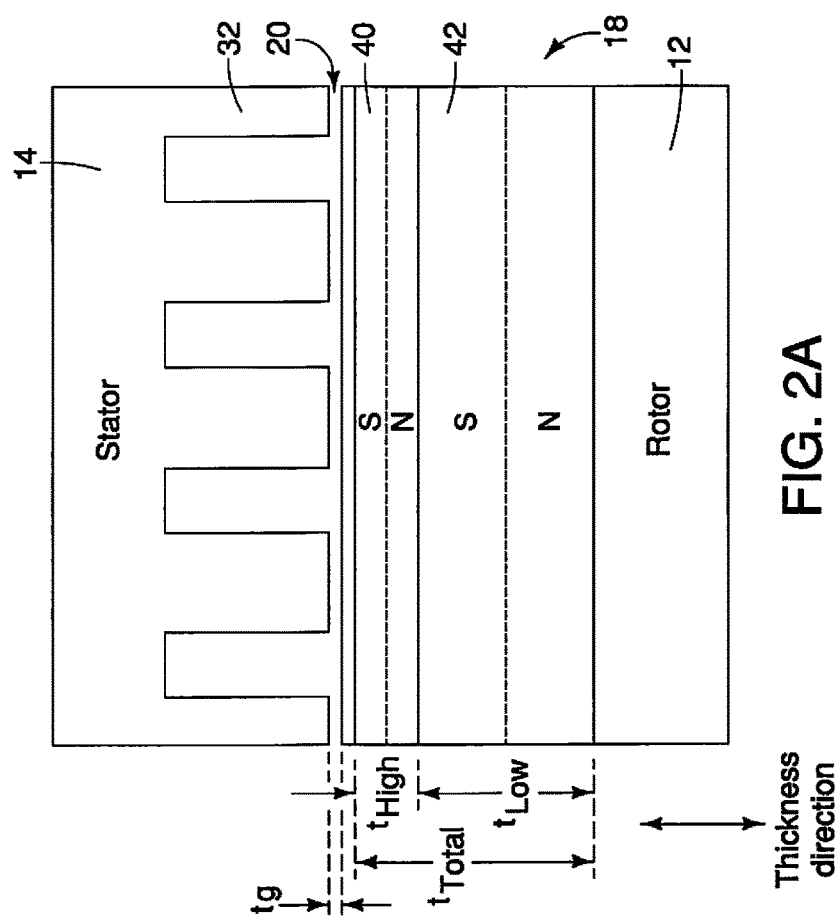
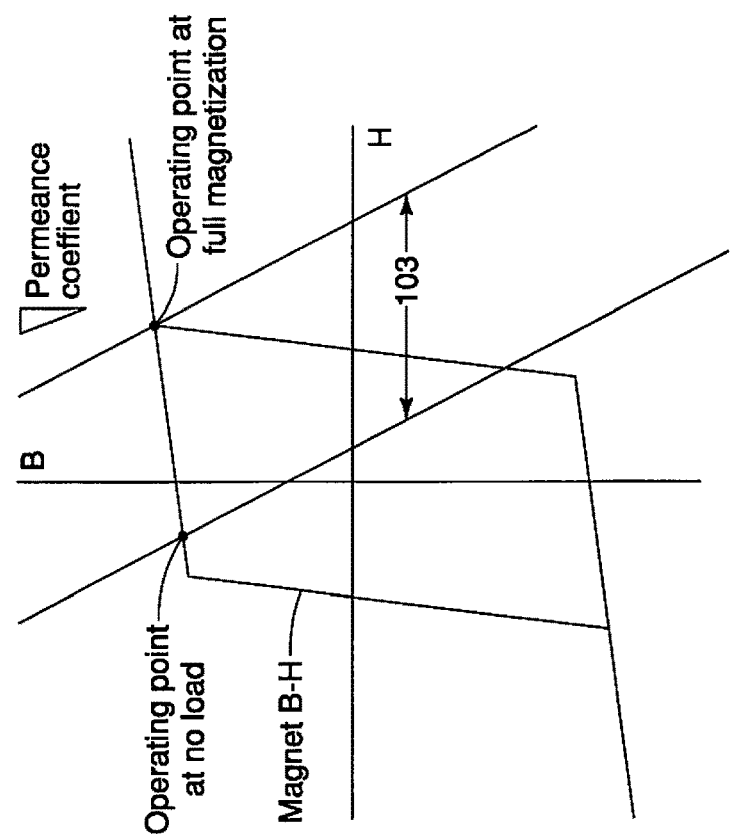
FIG. 2A
FIG. 2B

PERMANENT MAGNET SYNCHRONOUS MOTOR

BACKGROUND

Field of the Invention

The present invention generally relates to a permanent magnet synchronous motor. More specifically, the present invention relates to a permanent magnet synchronous motor with variable permanent magnet (PM) magnetization characteristics.

Background Information

Electric vehicles and hybrid electric vehicles (HEV) include an electric motor that operates as a drive source for the vehicle. In a purely electric vehicle, the electric motor operates as the sole drive source. On the other hand, an HEV includes an electric motor and a conventional combustion engine that operate as the drive sources for the vehicle based on conditions as understood in the art.

Electric vehicles and HEVs can employ an electric motor having variable PM magnetization characteristics as understood in the art. For example, the PM magnetization level of the motor can be increased to increase the torque generated by the motor. Accordingly, when the driver attempts to accelerate the vehicle to, for example, pass another vehicle, the motor control system can change the magnetization level by applying a pulse current for increasing the torque output of the motor and thus increasing the vehicle speed.

An electric motor which includes a rotor with a low coercive force magnet and a high coercive force magnet that are arranged magnetically in series with each other is known in the art (see Japanese Patent Application No. 2008-162201, for example). With this motor, the magnetization level of the low coercive force magnet is changeable according to the operating state of the motor to improve the motor efficiency.

SUMMARY

With this motor, by arranging the low coercive force magnet and the high coercive force magnet magnetically in series with each other, the stator current required for the full magnetization can be reduced. However, with this motor, the range of achievable magnetization levels is not large enough to significantly improve the motor efficiency. For example, with this motor, it is difficult to reduce the iron loss in a high speed and low torque operation.

One object is to provide a permanent magnet synchronous motor with which the motor efficiency is properly improved.

In view of the state of the known technology, one aspect of a permanent magnet synchronous motor includes a stator, a rotor rotatable relative to the stator, and a magnetic structure with a low coercive force magnet and a high coercive force magnet that are arranged magnetically in series with respect to each other to define a pole-pair of the permanent magnet synchronous motor. A magnetization level of the low coercive force magnet being changeable by a stator current pulse, and a stator magnetomotive force at a rated current being equal to or larger than a product of a magnetic field strength for fully magnetizing the low coercive force magnet and a thickness of the low coercive force magnet.

BRIEF DESCRIPTION OF THE DRAWINGS

Referring now to the attached drawings which form a part of this original disclosure:

FIG. 2A is a schematic diagram of a magnetic structure forming a pole of the permanent magnet synchronous motor;

FIG. 2B is a graph illustrating the relationship between the B-H curve of a low coercive force magnet and the permeance curve obtained based on the equivalent magnetic circuit of the permanent magnet synchronous motor;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
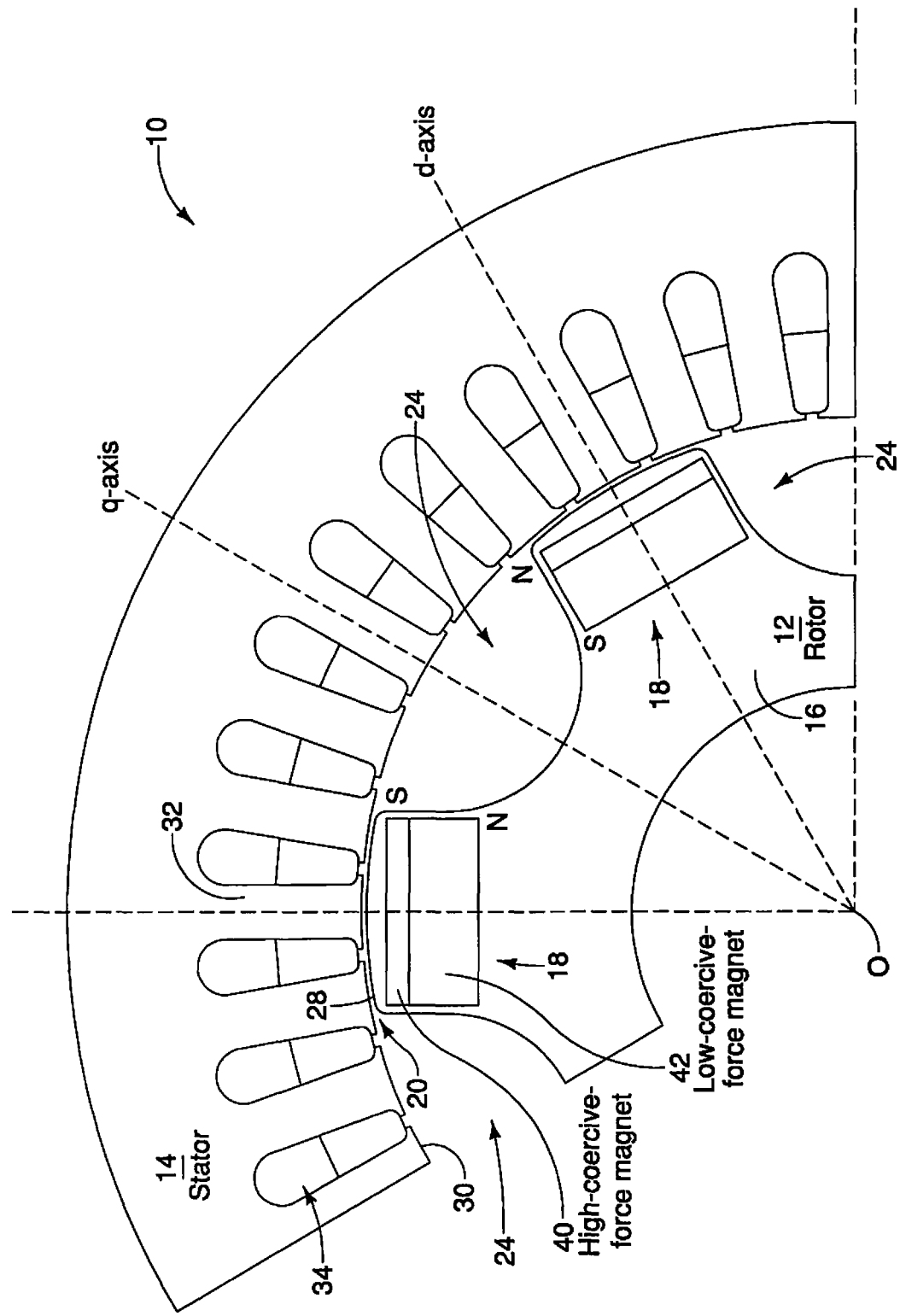
FIG. 1 is a partial cross-sectional view of a permanent magnet synchronous motor in accordance with a first embodiment.

Referring to FIG. 1, a permanent magnet synchronous motor 10, which can also be referred to as an interior permanent magnet motor (IPM), is illustrated in accordance with a first embodiment. As shown in FIG. 1, the motor 10 basically includes a rotor 12 and a stator 14. The motor 10 can be employed in any type of electric vehicle or HEV such as an automobile, truck, SUV and so on, and in any other type of apparatus as understood in the art. The rotor 12 and the stator 14 can be made of metal or any other suitable material as understood in the art. In the illustrated embodiment, as shown in FIG. 1, the motor 10 is illustrated as IPM. However, the motor 10 can be any other type of permanent magnet synchronous motor, such as a surface permanent magnet synchronous motor (SPM) as understood in the art.

In the illustrated embodiment, the rotor 12 is rotatable relative to the stator 14, and has a rotor core 16. The motor 10 also includes a plurality of (six in the illustrated embodiment) magnets 18 (e.g., magnet structures) that is fixedly mounted to the rotor core 16. The rotor core 16 is rotatable relative to the stator 14 about a center rotational axis O of the motor 10, and is radially inwardly disposed relative to the stator 14 with an air gap 20 therebetween. The rotor core 16 is configured to include a plurality of flux barriers 24. The rotor core 16 is basically formed as a one-piece, unitary member. In the illustrated embodiment, the rotor core 16 is radially inwardly disposed relative to the stator 14 with the air gap 20 therebetween. However, the the rotor core 16 can be radially outwardly disposed relative to the stator 14 with an air gap therebetween as understood in the art. In the illustrated embodiment, the rotor 12 can employ a conventional rotor as known in the art. Thus, detailed descriptions will be omitted for the sake of brevity. For example, the rotor 12 can further include a surface bridge that is present to form a radially outward boundary of each flux barrier 24 that also forms a part of an outer periphery of the rotor 12.

In the illustrated embodiment, the stator 14 is concentrically arranged relative to the rotor 12 with respect to the center rotational axis O of the motor 10. As mentioned above, the stator 14 is radially outwardly disposed relative to the rotor 12 with the air gap 20 therebetween. In particular, as illustrated in FIG. 1, the air gap 20 is present between an outer circumference 28 of the rotor 12 and an inner circumference 30 of the stator 14 to enable the rotor 12 to rotate unrestrictedly or substantially unrestrictedly about the center rotational axis O. The stator 14 basically includes a plurality of stator teeth 32, a plurality of stator slots 34, and other components which can be configured in any conventional manner. In the illustrated embodiment, the stator teeth 32 are configured as wide stator teeth as known in the art. However, the stator teeth 32 can have any suitable size, and the stator 14 can include any number of stator teeth 32 to achieve the operability of the embodiments discussed herein. In this example, the stator teeth 32 are open to the inner circumference 30 of the stator 14, but can be closed if desired. The stator slots 34 are inserted with copper or aluminum wires wound about the stator teeth 32. However, the stator windings can be made of any suitable type of material as known in the art. In the illustrated embodiment, the stator 14 can employ a conventional stator as known in the art. Thus, detailed descriptions will be omitted for the sake of brevity.

In the illustrated embodiment, the magnets 18 are spaced between adjacent pairs of the flux barriers 24 about the circumference of the rotor 12. As shown in FIG. 1, each of the magnets 18 has a high coercive force magnet 40 and a low coercive force magnet 42, and defines each of the motor poles (pole-pairs) of the motor 10 with alternate polarities. In the illustrated embodiment, six sets of the magnets 18 are circumferentially positioned between six flux barriers 24. However, the number of the magnets 18 can change with respect to a change in the number of flux barriers 24. In the illustrated embodiment, as shown in FIG. 1, the d-axis passes through a center of each magnet 18. On the other hand, the q-axis passes through each flux barriers 24. In other words, the q-axis passes between adjacent pair of magnets 18. However, the magnets 18 or the flux barriers 24 can be positioned at any suitable location with respect to the d-axis and the q-axis to achieve the operability of the embodiments discussed herein. With this motor 10, the magnetization level of the low coercive force magnet 42 is changeable by the stator current pulse applied to the stator 14 as understood in the art.

Referring further to FIG. 2A, the magnet configuration of each of the magnets 18 will be explained. As illustrated in FIGS. 1 and 2A, each of the magnets 18 includes the high coercive force magnet 40 and the low coercive force magnet 42 that are arranged magnetically in series with respect to each other to define a single motor pole of the motor 10. Specifically, as illustrated in FIGS. 1 and 2A, the low coercive force magnet 42 and the high coercive force magnet 40 are stacked with respect to each other in a thickness direction that is parallel to a radial direction or the d-axis of the motor 10 to define the motor pole of the motor 10. Also, in the illustrated embodiment, the high coercive force magnet 40 is disposed closer to the air gap 20 between the stator 14 and the rotor 12 than the low coercive force magnet 42 is. This arrangement is preferable as understood in the art. However, alternatively, the low coercive force magnet 42 can be disposed closer to the air gap 20 between the stator 14 and the rotor 12 than the high coercive force magnet 40 is, as understood in the art.

In the illustrated embodiment, the high coercive force magnet 40 includes an NdFeB magnet, while the low coercive force magnet 42 includes a SmCo magnet. However, the high coercive force magnet 40 and the low coercive force magnet 42 can be made of any suitable type of material as understood in the art.

Figure 3:
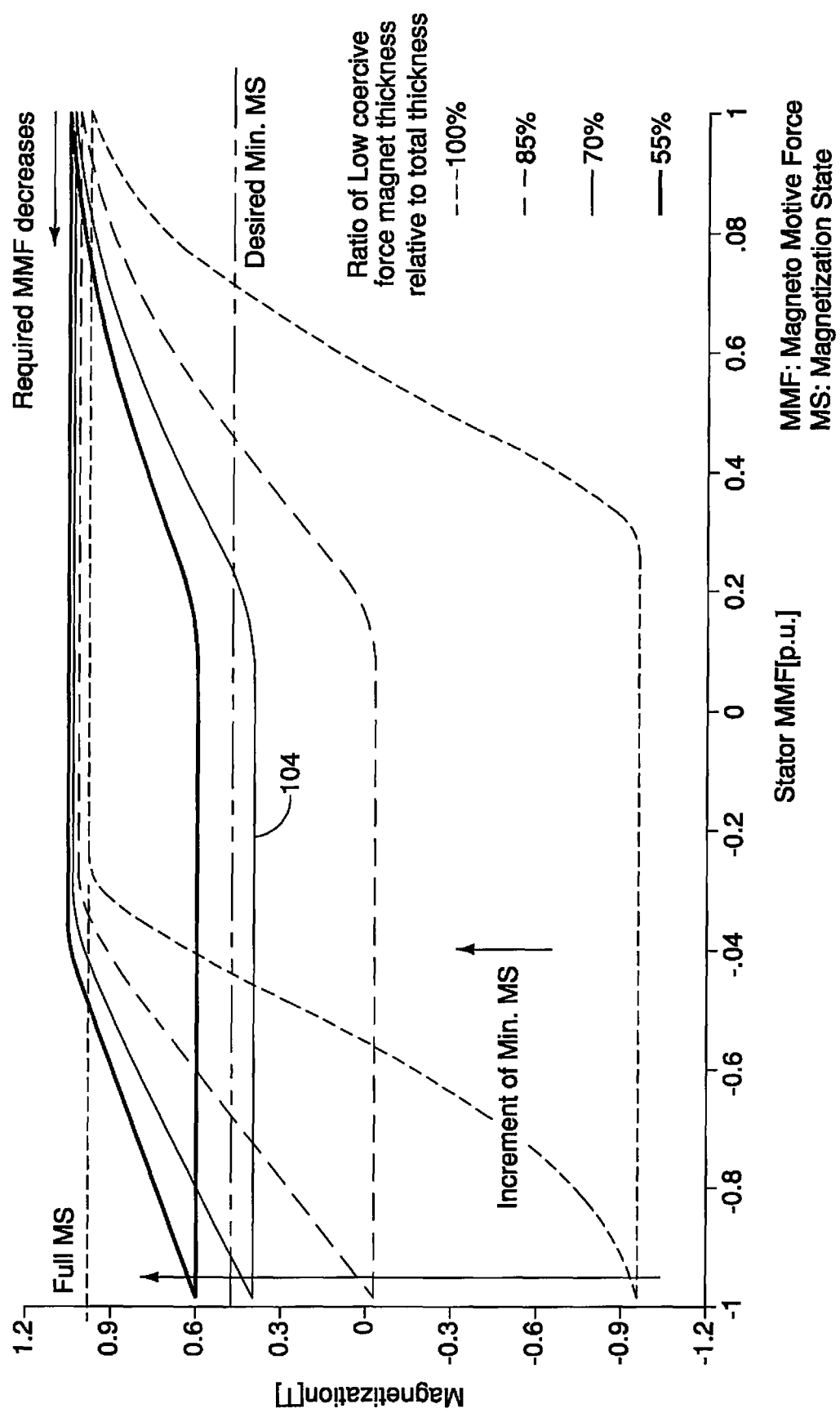
FIG. 3 shows graphs illustrating the relationships between the stator magnetomotive force and the magnetization levels of the low coercive force magnets having different thickness ratios relative to the total thickness of the magnetic structure.

Also, in the illustrated embodiment, the thickness $t_{Low}$ of the low coercive force magnet 42 per pole-pair is equal to or more than 70% of the total thickness $t_{Total}$ of the low coercive force magnet 42 and the high coercive force magnet 40 per pole-pair (i.e., the total of the thickness $t_{Low}$ of the low coercive force magnet 42 and the thickness $t_{High}$ of the high coercive force magnet 40) as illustrated in FIG. 3 described below. More preferably, the thickness $t_{Low}$ of the low coercive force magnet 42 per pole-pair is equal to or more than 75% of the total thickness $t_{Total}$ of the low coercive force magnet 42 and the high coercive force magnet 40 per pole-pair (i.e., the total of the thickness $t_{Low}$ of the low coercive force magnet 42 and the thickness $t_{High}$ of the high coercive force magnet 40). Specifically, in the illustrated embodiment, the thickness $t_{Low}$ of the low coercive force magnet 42 per pole-pair is 75% of the total thickness $t_{Total}$ of the low coercive force magnet 42 and the high coercive force magnet 40 per pole-pair, for example.

In the illustrated embodiment, the above-described magnet configuration of the magnets 18 is provided for illustration only, and can employ any other configurations that are determined in the following manner explained referring to FIGS. 2B and 3. Specifically, the required stator magnetomotive force and the magnet configuration, such as the thicknesses $t_{High}$ and $t_{Low}$ of the high and low coercive force magnets 40 and 42, can be determined in the following manner to achieve the desired magnetization state with reduced current.

FIG. 2B is a graph illustrating the relationship between the B-H curve of the low coercive magnet 42 and the permeance curve obtained based on the equivalent magnetic circuit of the motor 10. As understood in the art, referring to FIG. 2B, to fully magnetize the low coercive force magnet 42, the stator magnetomotive force at the rated current is required to be equal to or more than the product of the thickness $t_{Low}$ of the low coercive force magnet and the magnetic field strength 103 that is required for fully magnetizing the low coercive force magnet 42. Specifically, as shown in FIG. 2B, the magnetic field strength 103 is a magnetic field strength illustrated between the permeance curve having a slope of the permeance coefficient and passing through the operating point at the full magnetization and the permeance curve having a slope of the permeance coefficient and passing through the operating point at no load. Here, the rated current is a stator current that the motor 10 can carry, under specified conditions, without resulting in overheating or mechanical overstress, for example, as understood in the art. Thus, the rated current is predetermined for the motor 10, for example.

FIG. 3 shows graphs illustrating the relationships between the stator magnetomotive force ("Stator MMF") and the magnetization levels ("Magnetization") of low coercive force magnets having different thickness ratios relative to the total thickness of magnetic structures, each having a low coercive force magnet and a high coercive force magnet.

Specifically, FIG. 3 illustrates the relationships between the stator magnetomotive force and the magnetization levels of the low coercive force magnets having the thickness ratios of 55%, 70%, 85% and 100%, respectively, relative to the total thickness of the magnetic structures. As understood in the art, when the thickness ratio of the low coercive force magnet is 100%, the magnetic structure only includes the low coercive force magnet. In the illustrated embodiment, for the low coercive force magnets having different thickness ratios, the total thickness of the magnetic structures is constant. Referring to FIG. 3, the stator magnetomotive force required for fully magnetizing the low coercive force magnet decreases and the minimum magnetization level at the rated current increases as the thickness ratio of the low coercive force magnet decreases. Thus, for example, if the magnet configuration of the magnet 18 has a magnetization characteristic, such as the magnetization characteristic 104, then the desired magnetization level can be achieved while the stator current is reduced.

As understood in the art, the stator magnetomotive force required for fully magnetizing the low coercive force magnet 42 is expressed by the following formula (1):

$$MMF \geq H_{Max}t_{Low} - \frac{J_{High}}{\mu_0\mu_{rh}}t_{High} + \left(\frac{J_{Max}}{\mu_0\mu_{rl}} + H_{Max}\right)(t_{High} + t_g) \quad (1)$$

where MMF represents the stator magnetomotive force per pole-pair at the rated current or the available stator magnetomotive force of the stator winding per pole-pair with the rated current density, $H_{Max}$ represents the magnetic field strength for fully magnetizing the low coercive force magnet 42, $t_{Low}$ represents the thickness of the low coercive force magnet 42, $J_{High}$ represents the magnetization of the high coercive force magnet 40, $\mu_0\mu_{rh}$ represents a magnetic permeability of the high coercive force magnet, $\mu_0\mu_{rl}$ represents a magnetic permeability of the low coercive force magnet, $t_{High}$ represents the thickness of the high coercive force magnet 40, $J_{Max}$ represents the magnetization of the low coercive force magnet 42 fully magnetized, and $t_g$ represents the air gap length between the stator 14 and the rotor 12.

Furthermore, as understood in the art, the stator magnetomotive force required for obtaining the desired minimum magnetization level is expressed by the following formula (2):

$$MMF \geq -H_{Min}t_{Low} + \frac{J_{High}}{\mu_0\mu_{rh}}t_{High} - \left(\frac{J_{Min}}{\mu_0\mu_{rl}} + H_{Min}\right)(t_{High} + t_g) \quad (2)$$

where MMF represents the stator magnetomotive force per pole at the rated current, $H_{Min}$ represents the magnetic field strength for demagnetizing the low coercive force magnet 42 to the desired level (e.g., the desired minimum magnetization level), $t_{Low}$ represents the thickness of the low coercive force magnet 42, $J_{High}$ represents the magnetization of the high coercive force magnet 40, $\mu_0\mu_{rh}$ represents a magnetic permeability of the high coercive force magnet, $\mu_0\mu_{rl}$ represents a magnetic permeability of the low coercive force magnet, $t_{High}$ represents the thickness of the high coercive force magnet 40, $J_{Min}$ represents the magnetization of the low coercive force magnet 42 for demagnetizing the low coercive force magnet 42 to the desired level (e.g., the desired minimum magnetization level), and $t_g$ represents the air gap length between the stator 14 and the rotor 12.

In the illustrated embodiment, the configurations of the stator 14, the rotor 12 and the magnet 18 (e.g., the magnetic structure) are determined such that the stator 14, the rotor 12 and the magnet 18 are configured to satisfy the formulas (1) and (2). For example, in the illustrated embodiment, the stator magnetomotive force MMF of the stator 14 and the magnet configuration of the magnet 18 that satisfy the desired minimum magnetization level are determined by the formula (2), and then it is also determined if the determined stator magnetomotive force MMF and the determined magnet configuration also satisfy the formula (1). With this arrangement, the magnet configuration that minimizes the stator magnetomotive force MMF while satisfying the desired minimum magnetization level can be obtained.

In the illustrated embodiment, the desired minimum magnetization level of the low coercive force magnet 42 is preferably equal to or less than the half of or the substantially half of the maximum magnetization level of the low coercive force magnet 42 in view of the operating points of the driving modes and the loss reduction to obtain the desired magnetization range (or variable magnetization state capability). Thus, the configurations of the stator 14, the rotor 12 and the magnet 18 (e.g., the magnetic structure) are determined such that the stator 14, the rotor 12 and the magnet 18 are further configured to satisfy the following formula (3):

$$J_{Min} \leq \frac{J_{Max}}{2} \quad (3)$$

where $J_{Min}$ represents the magnetization of the low coercive force magnet 42 for demagnetizing the low coercive force magnet 42 to the desired level (e.g., the desired minimum magnetization level), and $J_{Max}$ represents the magnetization of the low coercive force magnet 42 fully magnetized.

Thus, if the magnet configuration of the magnet 18 has a magnetization characteristic, such as the magnetization characteristic 104, among the magnetization characteristics illustrated in FIG. 3, then the desired stator magnetomotive force or the stator current can be minimized. Specifically, the magnetization characteristic 104 illustrates the relationship between the stator magnetomotive force (stator MMF) and the magnetization level of the low coercive force magnet 42 when the thickness of the low coercive force magnet 42 is equal to 70% of the total thickness of the magnet 18.

With this arrangement, the desired stator magnetomotive force or the stator current can be minimized while achieving the desired magnetization range or change amount of the magnetization level. Thus, the increase of the copper loss accompanied by the magnetization state control of the low coercive force magnet 42 can be minimized. Also, the iron loss in the high speed and low torque operation can be decreased, which improves the motor efficiency.

Figure 4:
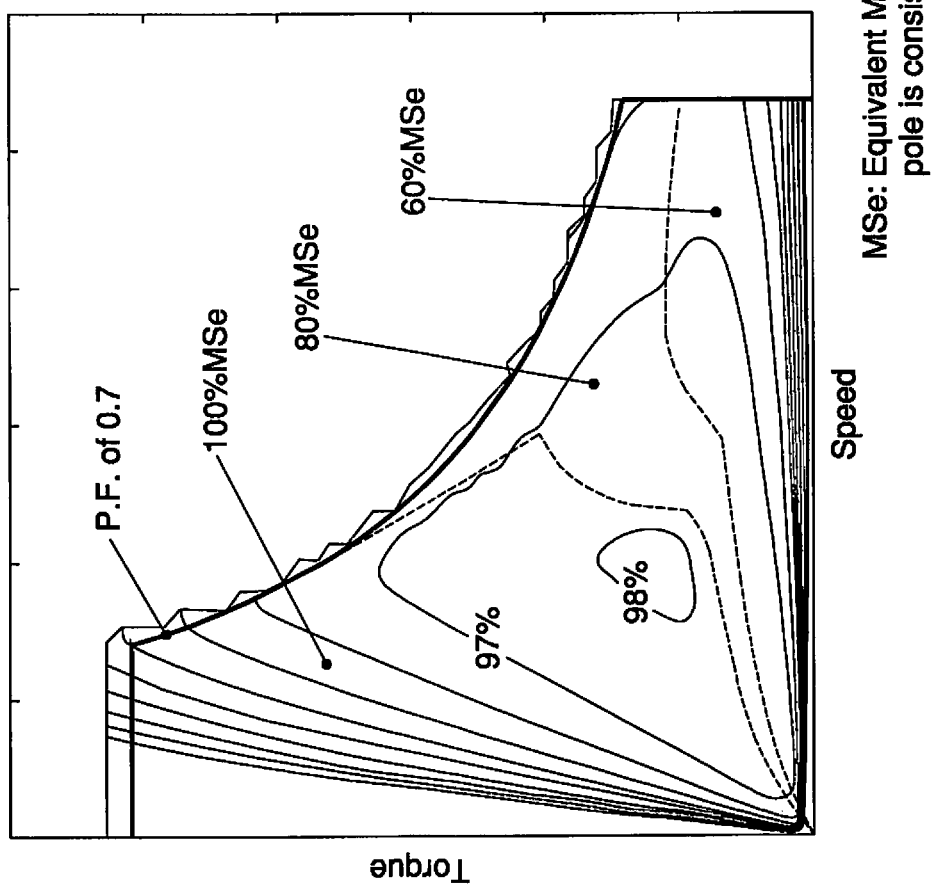
FIG. 4 is a contour diagram illustrating the motor efficiency of the permanent magnet synchronous motor with the NT characteristics of the permanent magnet synchronous motor.

In the illustrated embodiment, as shown in FIGS. 1 and 2A, the low coercive force magnet 42 includes the SmCo magnet, the high coercive force magnet 40 includes the NdFeB magnet, and the thickness $t_{Low}$ of the low coercive force magnet 42 per pole-pair is 75% of the total thickness $t_{Total}$ of the low coercive force magnet 42 and the high coercive force magnet 40 per pole-pair, for example. Also, with the motor 10, as illustrated in FIGS. 1 and 2A, the low coercive force magnet 42 and the high coercive force magnet 40 are stacked with respect to each other in the thickness direction to define the pole-pair of the motor 10, and the high coercive force magnet 40 is disposed closer to the air gap 20 between the stator 14 and the rotor 12 than the low coercive force magnet 42 is. Also, with this motor 10, the stator 14, the rotor 12 and the magnet 18 are further configured to satisfy the formulas (1) to (3). FIG. 4 illustrates the contour diagram illustrating the motor efficiency of the motor 10 with the torque-speed characteristics of the motor 10.

With this arrangement of the motor 10, the full magnetization of the low coercive force magnet 40-42 and the minimum magnetization level equal to or less than half of or substantially half of the full magnetization level can be achieved. Also, as illustrated in FIG. 4, the minimum value of the equivalent magnetization level (MSe) that is defined by the total magnetomotive force of the low coercive force magnet 42 and the high coercive force magnet 40 is approximately 60% of the full magnetization level of the low coercive force magnet 42, as illustrated by the areas (100% MSe, 80% MSe, and 60% MSe) separated by dotted lines. Also, as illustrated in FIG. 4, at the entire speed range required for the motor 10 including the high speed and low torque range, the power factor thereof is equal to or more than 0.7, which is a value that is generally required for the synchronous motor.

Furthermore, with this motor 10, as shown in FIGS. 1 and 2A, the high coercive force magnet 40 is disposed closer to the air gap 20 between the stator 14 and the rotor 12 than the low coercive force magnet 42 is. With this arrangement, even if the stator magnetomotive force having the spatial harmonic is applied to the magnet 18, the high coercive force magnet 40 prevents the instantaneous demagnetization, which also prevents the torque decrease during the motor operation.

Furthermore, with this motor 10, the stator current required for the magnetization state control of the low coercive force magnet 42 can be minimized while achieving the change amount of the magnetization level required for improving the motor efficiency in the high speed and low torque operation. Also, the partial demagnetize of the low coercive force magnet 42 due to the harmonic of the stator magnetomotive force can be suppressed. Thus, the increase of the copper loss accompanied by the magnetization state control of the low coercive force magnet 42 can be suppressed, and the motor efficiency can be improved while maximizing the torque density.

In accordance with an aspect of the present application, the stator magnetomotive force MMF at the rated current is equal to or larger than the product of the magnetic field strength $H_{Max}$ for fully magnetizing the low coercive force magnet 42 and the thickness $t_{Low}$ of the low coercive force magnet 42. With this arrangement, the required stator current required for changing the magnetization can be decreased. Thus, the iron loss in the high speed and low torque operation can be reduced while preventing the increase of the copper loss accompanied by the magnetization, which improves the motor efficiency.

In accordance with an aspect of the present application, the thicknesses $t_{Low}$ and $t_{High}$ of the low coercive force magnet 42 and the high coercive force magnet 40, the coercivities of the low coercive force magnet 42 and the high coercive force magnet 40, the maximum magnetization level $J_{Max}$ of the low coercive force magnet 42, the air gap length $t_g$ and the stator magnetomotive force MMF are configured to satisfy the formula (1). With this arrangement, the required current for fully magnetizing the low coercive force magnet 42 is minimized. Thus, the iron loss in the high speed and low torque operation can be reduced while preventing the increase of the copper loss associated with the magnetization process, which improves the motor efficiency.

In accordance with an aspect of the present application, the thicknesses $t_{Low}$ and $t_{High}$ of the low coercive force magnet 42 and the high coercive force magnet 40, the coercivities of the low coercive force magnet 42 and the high coercive force magnet 40, the minimum magnetization level $J_{Min}$ of the low coercive force magnet 42, the air gap length $t_g$ and the stator magnetomotive force MMF are configured to satisfy the formula (2). With this arrangement, the minimum magnetization level required for improving the motor efficiency can be achieved while suppressing the increase of the stator current. Thus, the iron loss in the high speed and low torque operation can be reduced while preventing the increase of the copper loss accompanied by demagnetization, which improves the motor efficiency.

In accordance with an aspect of the present application, the maximum magnetization level $J_{Max}$ of the low coercive force magnet 42 and the minimum magnetization level $J_{Min}$ of the low coercive force magnet 42 is configured to satisfy the formula (3). With this arrangement, the iron loss in the high speed and low torque operation can be reduced, which improves the motor efficiency.

In accordance with an aspect of the present application, the low coercive force magnet 42 includes the SmCo magnet, the high coercive force magnet 40 includes the NdFeB magnet, and the thickness $t_{Low}$ of the low coercive force magnet 42 per pole-pair is equal to or more than 75% of the total thickness $t_{Total}$ of the low coercive force magnet 42 and the high coercive force magnet 40 per pole-pair. With this arrangement, the change amount of the magnetization level required for reducing the iron loss in the high speed and low torque operation can be ensured, and the stator current required for the magnetization state control of the low coercive force magnet 42 can be minimized. Thus, the increase of the copper loss accompanied by the magnetization state control of the low coercive force magnet 42 can be suppressed. Also, the iron loss in the high speed and low torque operation can be decreased, which improves the motor efficiency.

In accordance with an aspect of the present application, the low coercive force magnet 42 and the high coercive force magnet 40 are stacked with respect to each other in the thickness direction to define the pole-pair of the motor 10, and the high coercive force magnet 40 is disposed closer to the air gap 20 between the stator 14 and the rotor 12 than the low coercive force magnet 42 is. With this arrangement, the partial demagnetize of the low coercive force magnet 42 due to the harmonic of the stator magnetomotive force can be prevented. Thus, the motor efficiency can be improved while maximizing the torque density.

In the illustrated embodiment, the motor 10 is configured to satisfy the formulas (1) to (3). However, the motor 10 can also be configured to satisfy only one or two of the formulas (1) to (3) as needed and/or desired.

Second Embodiment

Figure 5:
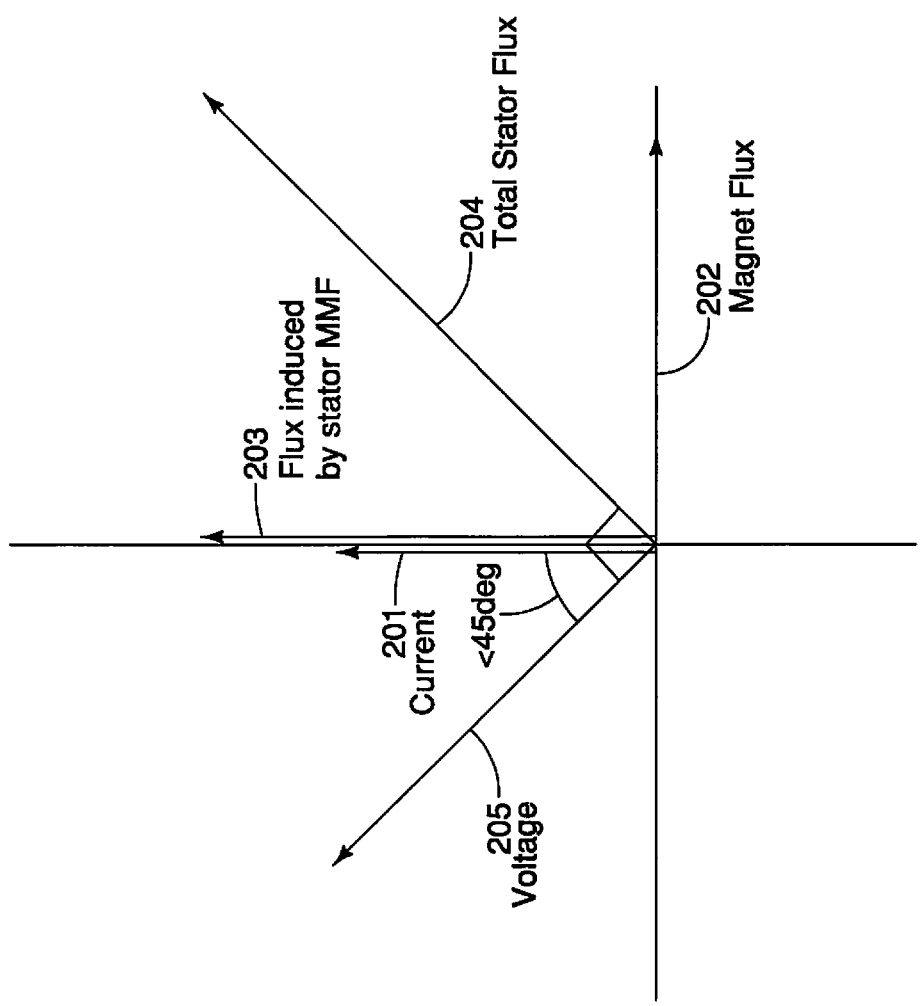
FIG. 5 is a vector diagram illustrating the relative phases of the current, the stator flux linkage, and the voltage of a permanent magnet synchronous motor in accordance with a second embodiment.

Referring now to FIG. 5, an example of a permanent magnet synchronous motor 10 in accordance with a second embodiment will now be explained. In view of the similarity between the first and second embodiments, the parts of the second embodiment that are identical to or substantially identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the motor 10 in accordance with the second embodiment is identical to the motor 10 in accordance with the first embodiment, except that the motor 10 in accordance with the second embodiment is further configured to satisfy the following formula (4):

$$MMF \leq \frac{J_{Max}}{\mu_0 \mu_{rl}} t_{Low} + \frac{J_{High}}{\mu_0 \mu_{rh}} t_{High} \qquad (4)$$

where MMF represents the stator magnetomotive force per pole-pair at the rated current, $J_{Max}$ represents the magnetization of the low coercive force magnet 42 fully magnetized, $\mu_0\mu_{rh}$ represents a magnetic permeability of the high coercive force magnet, $\mu_0\mu_{rl}$ represents a magnetic permeability of the low coercive force magnet, $t_{Low}$ represents the thickness of the low coercive force magnet 42, $J_{High}$ represents the magnetization of the high coercive force magnet 40, and $t_{High}$ represents the thickness of the high coercive force magnet 40.

Specifically, the required stator magnetomotive force and the magnet configuration, such as the thicknesses $t_{High}$ and $t_{Low}$ of the high and low coercive force magnets 40 and 42, can be determined based on the formula (4) to achieve the required power capability.

FIG. 5 illustrates a vector diagram illustrating the relative phases of the current, the stator flux linkage, and the voltage when the thickness $t_{Low}$ and the maximum magnetization level $J_{Max}$ of the low coercive force magnet 42, the thickness $t_{High}$ and the magnetization level $J_{High}$ of the high coercive force magnet 40, and the stator magnetomotive force MMF satisfy the formula (4). Specifically, FIG. 5 illustrates the stator magnetomotive force or stator current 201, the stator flux linkage 202 induced by the magnet 18, the stator flux linkage 203 induced by the stator magnetomotive force 201, the total stator flux linkage 204, and the voltage 205. When the magnet configuration of the magnet 18 and the stator magnetomotive force MMF satisfy the formula (4), the stator flux linkage 203 induced by the stator magnetomotive force 201 becomes smaller than the stator flux linkage 202 induced by the magnet 18, the phase difference between the current 201 and the voltage 205 is equal to or less than 45 degrees, and the power factor thereof is equal to or more than 0.7, which is a value that is generally required for the synchronous motor.

With this arrangement, the motor efficiency can be improved without increasing the capacity of the motor drive inverter relative to the conventional synchronous motor.

In accordance with an aspect of the present application, the thickness $t_{Low}$ and the maximum magnetization level $J_{Max}$ of the low coercive force magnet 42, the thickness $t_{High}$ and the magnetization level $J_{High}$ of the high coercive force magnet 40, and the stator magnetomotive force MMF are configured to satisfy the formula (4). With this arrangement, the power factor generally required for the synchronous motor can be achieved. Thus, the motor efficiency can be improved without increasing the capacity of the motor drive inverter.

In the illustrated embodiment, the motor 10 in accordance with the second embodiment is identical to the motor 10 in accordance with the first embodiment, except that the motor 10 in accordance with the second embodiment is further configured to satisfy the formula (4). In other words, in the illustrated embodiment, the motor 10 in accordance with the second embodiment is configured to satisfy the formulas (1) to (4). However, the motor 10 in accordance with the second embodiment can also be configured to satisfy only the formula (4) as needed and/or desired. Also, the motor 10 in accordance with the second embodiment can also be configured to satisfy the formula (4) in addition to only one or two of the formulas (1) to (3) as needed and/or desired.

Third Embodiment

Figure 6:
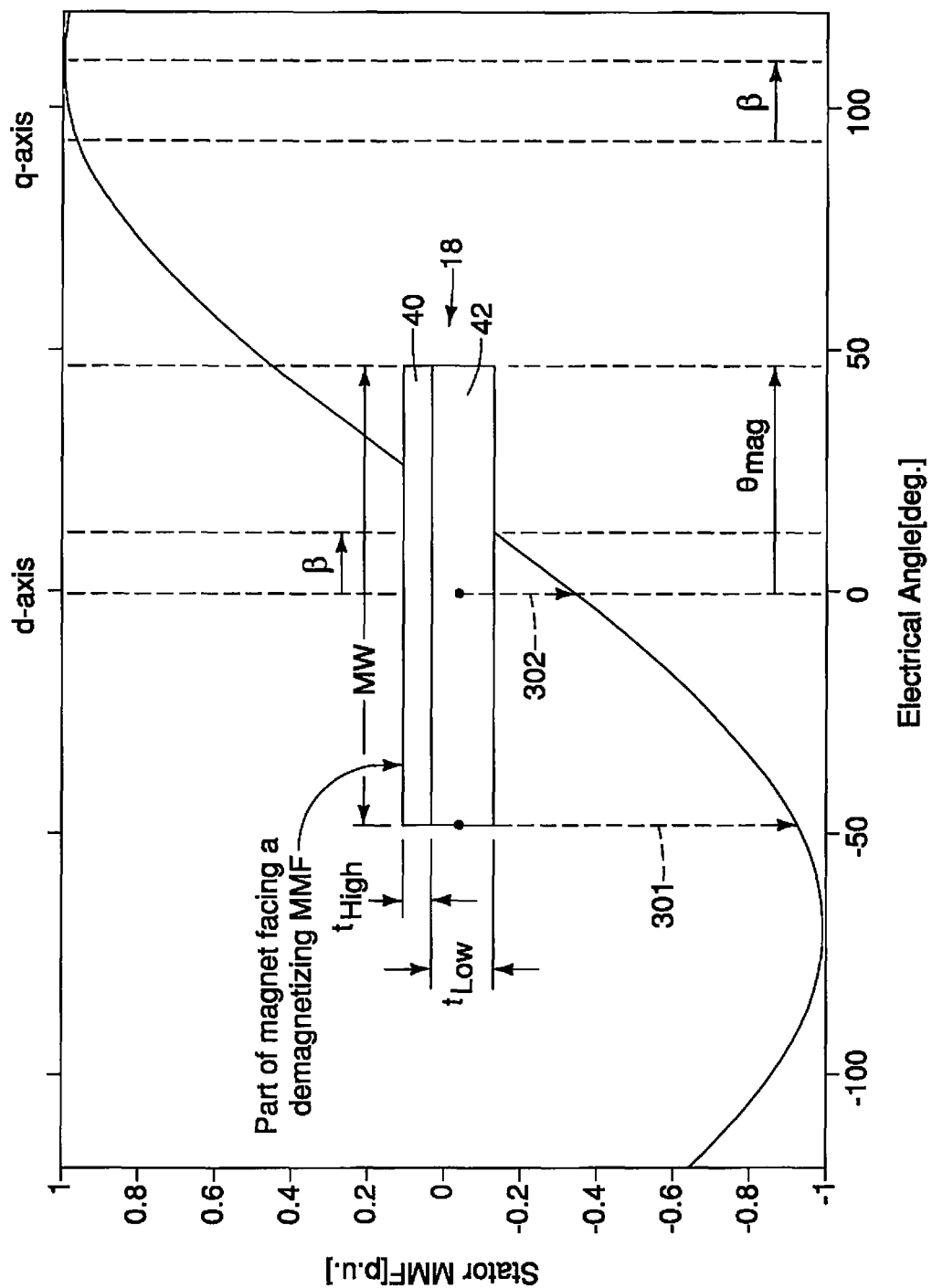
FIG. 6 is a diagram illustrating the relationship between the spatial distribution of the stator magnetomotive force and the relative position of a magnet of the permanent magnet synchronous motor in accordance with a third embodiment.

Referring now to FIG. 6, an example of a permanent magnet synchronous motor 10 in accordance with a third embodiment will now be explained. In view of the similarity between the first, second and third embodiments, the parts of the third embodiment that are identical to or substantially identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

Basically, the motor 10 in accordance with the third embodiment is identical to the motor 10 in accordance with the first or second embodiment, except that the motor 10 is further configured such that the low coercive force magnet 42 and the high coercive force magnet 40 have widths that are substantially equal to each other, respectively, and that the motor 10 is further configured to satisfy the following formula (5):

$$MMF\sin\left(\frac{Pmw}{4R_{si}}\right) \geq \qquad (5)$$

$$H_{c\_min}t_{Low} - \frac{J_{High}}{\mu_0\mu_{rh}}t_{High} - \left(\frac{J_{Max}}{\mu_0\mu_{rl}} - H_{c\_min}\right)(t_g + t_{High})$$

where MMF represents the stator magnetomotive force per pole at the rated current, P represents the total pole number, mw represents the magnet width, $R_{si}$ represents the stator inner radius, $H_{c\_min}$ represents coercive force of the low coercive force magnet 42 fully magnetized, $t_{Low}$ represents the thickness of the low coercive force magnet 42, $J_{High}$ represents the magnetization of the high coercive force magnet 40, $\mu_0\mu_{rh}$ represents a magnetic permeability of the high coercive force magnet, $\mu_0\mu_{rl}$ represents a magnetic permeability of the low coercive force magnet, $t_{High}$ represents the thickness of the high coercive force magnet 40, $J_{Max}$ represents the magnetization of the low coercive force magnet 42 fully magnetized, and $t_g$ represents the air gap length between the stator 14 and the rotor 12.

Specifically, the required stator magnetomotive force MMF and the magnet configuration, such as the magnet width mw of the magnet 18, can further be determined based on the formula (5) for maximally utilize the low coercive force magnet 42 by preventing demagnetization even under the maximum load with the maximum magnetization state condition.

FIG. 6 illustrates the stator magnetomotive force distribution per pole-pair at the current phase β when the stator magnetomotive force MMF has substantially sinusoidal waveform. As shown in FIG. 6, the center of the magnet 18 with the high and low coercive force magnets 40 and 42 is located at the electrical angle of zero degrees.

As shown in FIG. 6, the magnetic field 301 applied to the magnet 18 at the end portion of the magnet 18 is larger than the magnetic field 302 applied to the magnet 18 at the center of the magnet 18. In particular, as shown in FIG. 6, at the range where the electrical angel is negative, the magnetic field is applied in a direction to demagnetize the magnet 18. If this magnetic field strength exceeds the demagnetization limit, then the magnet 18 becomes unable to maintain the magnetization level, and will be demagnetized. On the other hand, when the stator magnetomotive force MMF and the magnet configuration, such as the magnet width mw, are configured to satisfy the formula (5), the magnetic field 301 applied to the end portion of the magnet 18 does not demagnetize the low coercive force magnet 42, and thus the partial demagnetization at the end portion of the magnet 18 can be prevented.

Thus, the low coercive force magnet 42 can be utilized maximally, which improve the motor efficiency while preventing the cost increase.

In accordance with an aspect of the present application, the low coercive force magnet 42 and the high coercive force magnet 40 have widths mw that are substantially equal to each other, respectively. Also, the widths mw are configured to satisfy the formula (5). With this arrangement, the demagnetization due to the stator magnetomotive force MMF can be prevented in the maximum torque operation. Thus, the low coercive force magnet 42 can be utilized maximally, which improve the motor efficiency while preventing the cost increase.

In the illustrated embodiment, the motor 10 in accordance with the third embodiment is identical to the motor 10 in accordance with the first or second embodiment, except that the motor 10 is further configured such that the low coercive force magnet 42 and the high coercive force magnet 40 have widths that are substantially equal to each other, respectively, and that the motor 10 is further configured to satisfy the formula (5). In other words, motor 10 in accordance with the third embodiment is configured such that the low coercive force magnet 42 and the high coercive force magnet 40 have widths that are substantially equal to each other, respectively, and is configured to satisfy the formulas (1) to (5). However, the motor 10 in accordance with the third embodiment can only be configured such that the low coercive force magnet 42 and the high coercive force magnet 40 have widths that are substantially equal to each other, respectively, and be configured to satisfy the formula (5) as needed and/or desired. Also, the motor 10 in accordance with the third embodiment can also be configured such that the low coercive force magnet 42 and the high coercive force magnet 40 have widths that are substantially equal to each other, respectively, and be configured to satisfy the formula (5) in addition to only one, two or three of the formulas (1) to (4) as needed and/or desired.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A permanent magnet synchronous motor comprising:
a stator;
a rotor rotatable relative to the stator; and
a magnetic structure with a low coercive force magnet and a high coercive force magnet that are arranged magnetically in series with respect to each other to define a pole-pair of the permanent magnet synchronous motor,
a magnetization level of the low coercive force magnet being changeable by a stator current pulse, and
a rated current of the permanent magnet synchronous motor being set such that a stator magnetomotive force at the rated current is equal to or larger than a product of a magnetic field strength for fully magnetizing the low coercive force magnet and a thickness of the low coercive force magnet.

2. The permanent magnet synchronous motor according to claim 1, wherein
the stator, the rotor and the magnetic structure are further configured to satisfy the following formula (1):

$$MMF \geq H_{Max} t_{Low} - \frac{J_{High}}{\mu_0 \mu_{rh}} t_{High} + \left(\frac{J_{Max}}{\mu_0 \mu_{rl}} + H_{Max}\right)(t_{High} + t_g) \quad (1)$$

where MMF represents the stator magnetomotive force per pole at the rated current, $H_{Max}$ represents the magnetic field strength for fully magnetizing the low coercive force magnet, $t_{Low}$ represents a thickness of the low coercive force magnet, $J_{High}$ represents a magnetization of the high coercive force magnet, $\mu_0 \mu_{rh}$ represents a magnetic permeability of the high coercive force magnet, $\mu_0 \mu_{rl}$ represents a magnetic permeability of the low coercive force magnet, $t_{High}$ represents a thickness of the high coercive force magnet, $J_{Max}$ represents a magnetization of the low coercive force magnet fully magnetized, and $t_g$ represents an air gap length between the stator and the rotor.

3. The permanent magnet synchronous motor according to claim 1, wherein
the stator, the rotor and the magnetic structure are further configured to satisfy the following formula (2):

$$MMF \geq -H_{Min}t_{Low} + \frac{J_{High}}{\mu_0\mu_{rh}}t_{High} - \left(\frac{J_{Min}}{\mu_0\mu_{rl}} + H_{Min}\right)(t_{High} + t_g) \quad (2)$$

where MMF represents the stator magnetomotive force per pole at the rated current, $H_{Min}$ represents a magnetic field strength for demagnetizing the low coercive force magnet to a desired level, $t_{Low}$ represents a thickness of the low coercive force magnet, $J_{High}$ represents a magnetization of the high coercive force magnet, $\mu_0\mu_{rh}$ represents a magnetic permeability of the high coercive force magnet, $\mu_0\mu_{rl}$ represents a magnetic permeability of the low coercive force magnet, $t_{High}$ represents a thickness of the high coercive force magnet, $J_{Min}$ represents a magnetization of the low coercive force magnet for demagnetizing the low coercive force magnet to the desired level, and $t_g$ represents an air gap length between the stator and the rotor.

4. The permanent magnet synchronous motor according to claim 1, wherein
the stator, the rotor and the magnetic structure are further configured to satisfy the following formula (3):

$$J_{Min} \leq \frac{J_{Max}}{2} \quad (3)$$

where $J_{Min}$ represents a magnetization of the low coercive force magnet for demagnetizing the low coercive force magnet to the desired level, and $J_{Max}$ represents a magnetization of the low coercive force magnet fully magnetized.

5. The permanent magnet synchronous motor according to claim 1, wherein
the stator, the rotor and the magnetic structure are further configured to satisfy the following formula (4):

$$MMF \leq \frac{J_{Max}}{\mu_0\mu_{rl}}t_{Low} + \frac{J_{High}}{\mu_0\mu_{rh}}t_{High} \quad (4)$$

where MMF represents the stator magnetomotive force per pole at the rated current, $J_{Max}$ represents a magnetization of the low coercive force magnet fully magnetized, $\mu_0\mu_{rh}$ represents a magnetic permeability of the high coercive force magnet, $\mu_0\mu_{rl}$ represents a magnetic permeability of the low coercive force magnet $t_{Low}$ represents a thickness of the low coercive force magnet, $J_{High}$ represents a magnetization of the high coercive force magnet, and $t_{High}$ represents a thickness of the high coercive force magnet.

6. The permanent magnet synchronous motor according to claim 1, wherein
the low coercive force magnet and the high coercive force magnet have widths that are substantially equal to each other, respectively, and
the stator, the rotor and the magnetic structure are further configured to satisfy the following formula (5):

$$MMF\sin\left(\frac{Pmw}{4R_{si}}\right) \geq \\ H_{c\_min}t_{Low} - \frac{J_{High}}{\mu_0\mu_{rh}}t_{High} - \left(\frac{J_{Max}}{\mu_0\mu_{rl}} - H_{c\_min}\right)(t_g + t_{High}) \quad (5)$$

where MMF represents the stator magnetomotive force per pole at the rated current, P represents a total pole number, mw represents a magnet width, $R_{si}$ represents a stator inner radius, $H_{c\_min}$ represents coercive force of the low coercive force magnet fully magnetized, $t_{Low}$ represents a thickness of the low coercive force magnet, $J_{High}$ represents a magnetization of the high coercive force magnet, $\mu_0\mu_{rh}$ represents a magnetic permeability of the high coercive force magnet, $\mu_0\mu_{rl}$ represents a magnetic permeability of the low coercive force magnet, $t_{High}$ represents a thickness of the high coercive force magnet, $J_{Max}$ represents a magnetization of the low coercive force magnet fully magnetized, and $t_g$ represents an air gap length between the stator and the rotor.

7. The permanent magnet synchronous motor according to claim 1, wherein
the low coercive force magnet includes a SmCo magnet,
the high coercive force magnet includes a NdFeB magnet, and
a thickness of the low coercive force magnet per pole-pair is equal to or more than 75% of a total thickness of the low coercive force magnet and the high coercive force magnet per pole-pair.

8. The permanent magnet synchronous motor according to claim 1, wherein
the low coercive force magnet and the high coercive force magnet are stacked with respect to each other in a thickness direction to define the pole-pair of the permanent magnet synchronous motor, and
the high coercive force magnet is disposed closer to an air gap between the stator and the rotor than the low coercive force magnet is.

* * * * *